United States Patent
Jadric et al.

(10) Patent No.: US 7,081,734 B1
(45) Date of Patent: Jul. 25, 2006

(54) RIDE-THROUGH METHOD AND SYSTEM FOR HVACANDR CHILLERS

(75) Inventors: Ivan Jadric, York, PA (US); Harold Robert Schnetzka, York, PA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 11/218,757

(22) Filed: Sep. 2, 2005

(51) Int. Cl.
H02P 27/04 (2006.01)
(52) U.S. Cl. .................. 318/801; 318/767; 318/798; 318/799; 318/800; 318/804; 318/806; 318/807; 318/808; 318/812; 318/9
(58) Field of Classification Search .............. None
See application file for complete search history.

(56) References Cited

U.S. PATENT DOCUMENTS

| | | | | |
|---|---|---|---|---|
| 3,593,103 | A | * | 7/1971 | Chandler et al. ............ 363/174 |
| 4,308,491 | A | * | 12/1981 | Joyner et al. ............... 318/732 |
| 4,339,779 | A | * | 7/1982 | Kalbach ....................... 361/33 |
| 4,663,536 | A | * | 5/1987 | Roesel et al. .................. 290/7 |
| 4,879,475 | A | * | 11/1989 | Ruge et al. ................... 307/68 |
| 5,081,368 | A | | 1/1992 | West |
| 5,123,080 | A | * | 6/1992 | Gillett et al. ............... 388/811 |
| 5,127,085 | A | * | 6/1992 | Becker et al. .............. 318/434 |
| 5,227,943 | A | * | 7/1993 | Cargille ....................... 361/88 |
| 5,298,848 | A | | 3/1994 | Ueda et al. |
| 5,304,900 | A | * | 4/1994 | Hayazaki et al. ............. 318/34 |
| 5,410,230 | A | | 4/1995 | Bessler et al. |
| 5,592,058 | A | | 1/1997 | Archer et al. |
| 5,646,458 | A | * | 7/1997 | Bowyer et al. ............... 307/67 |
| 5,747,955 | A | | 5/1998 | Rotunda et al. |
| 5,796,234 | A | | 8/1998 | Vrionis |
| 5,869,946 | A | | 2/1999 | Carobolante |
| 5,936,855 | A | | 8/1999 | Salmon |
| 5,969,966 | A | | 10/1999 | Sawa et al. |

(Continued)

FOREIGN PATENT DOCUMENTS

EP     0 272 776 A2     6/1988

(Continued)

OTHER PUBLICATIONS

A novel ride-through system for adjustable-speed drives using common-mode voltage□□Yonk-Seok Kim; Seung-Ki Sul;□□Industry Applications, IEEE Transactions on□□vol. 37, Issue 5, Sep.-Oct. 2001 pp. 1373-1382.*

(Continued)

Primary Examiner—Rina Duda
Assistant Examiner—Robert W. Horn
(74) Attorney, Agent, or Firm—McNees Wallace & Nurick LLC

(57) ABSTRACT

A method of providing ride-through capability in a chiller/refrigeration system employs a variable speed drive with an active converter stage, a DC link stage and an inverter stage for providing variable frequency and voltage to power at least one motor. An induction motor is coupled to the output of the inverter stage for driving a compressor in the chiller/refrigeration system. The ride-through method comprises operating the active converter to regulate the DC link voltage of the DC link stage to a predetermined voltage level until the current through the active converter equals a predetermined current limit, then transferring regulation of the DC link to the inverter upon reaching the current limit of the converter. The compressor is unloaded, and the power flow through the inverter is reversed to maintain the voltage level of the DC link stage.

33 Claims, 11 Drawing Sheets

U.S. PATENT DOCUMENTS

| | | | |
|---|---|---|---|
| 6,005,362 A * | 12/1999 | Enjeti et al. | 318/479 |
| 6,072,302 A | 6/2000 | Underwood et al. | |
| 6,118,676 A | 9/2000 | Divan et al. | |
| 6,133,716 A * | 10/2000 | Schutten | 322/40 |
| 6,160,722 A | 12/2000 | Thommes et al. | |
| 6,239,513 B1 * | 5/2001 | Dean et al. | 307/64 |
| 6,262,544 B1 * | 7/2001 | Disser et al. | 318/245 |
| 6,276,148 B1 | 8/2001 | Shaw | |
| 6,313,600 B1 | 11/2001 | Hammond et al. | |
| 6,316,918 B1 * | 11/2001 | Underwood et al. | 322/20 |
| 6,348,775 B1 | 2/2002 | Edelson et al. | |
| 6,411,065 B1 * | 6/2002 | Underwood et al. | 322/20 |
| 6,487,096 B1 | 11/2002 | Gilbreth et al. | |
| 6,516,922 B1 * | 2/2003 | Shadkin et al. | 187/290 |
| 6,559,562 B1 * | 5/2003 | Rostron | 307/130 |
| 6,686,718 B1 * | 2/2004 | Jadric et al. | 318/801 |
| 6,720,674 B1 * | 4/2004 | Gabrys | 307/68 |
| 6,768,284 B1 | 7/2004 | Lee et al. | |
| 6,777,898 B1 * | 8/2004 | Peterson | 318/139 |
| 6,801,019 B1 | 10/2004 | Haydock et al. | |
| 6,850,426 B1 * | 2/2005 | Kojori et al. | 363/123 |
| 6,954,366 B1 * | 10/2005 | Lai et al. | 363/71 |
| 2003/0015873 A1 * | 1/2003 | Khalizadeh et al. | 290/7 |
| 2003/0098668 A1 * | 5/2003 | Jadric et al. | 318/801 |
| 2003/0218887 A1 * | 11/2003 | Kojori et al. | 363/16 |
| 2005/0057210 A1 * | 3/2005 | Ueda et al. | 318/801 |
| 2005/0068001 A1 * | 3/2005 | Skaug et al. | 318/807 |
| 2005/0225270 A1 * | 10/2005 | Schnetzka et al. | 318/66 |
| 2005/0258795 A1 * | 11/2005 | Choi | 318/625 |
| 2005/0278071 A1 * | 12/2005 | Durham | 700/276 |
| 2005/0281681 A1 * | 12/2005 | Anderson et al. | 417/44.11 |
| 2005/0283277 A1 * | 12/2005 | Schulz | 700/282 |

FOREIGN PATENT DOCUMENTS

| | | |
|---|---|---|
| EP | 0 283 954 A2 | 9/1988 |
| EP | 0 313 366 A2 | 4/1989 |
| EP | 0 422 221 A1 | 11/1989 |
| WO | WO 93/14559 | 7/1993 |
| WO | WO 97/32168 | 9/1997 |

OTHER PUBLICATIONS

Extended ride-through capability for matrix converter drives with continuous motor synchronization Wiechmann, E.P.; Burgos, R.P.; Rodriguez, J.R.; Power Electronics, Machines and Drives, 2002. International Conference on (Conf. Publ. No. 487) Jun. 4-7, 2002 pp. 189-194.*

Ride-through alternatives for adjustable-speed drives-computational analysis, Belchior, F.N.; Oliviera, J.C.; Leao, P.C.A.; Souto, O.C.N., Industrial Electronics, 2003. ISIE '03. 2003 IEEE International Symposium on vol. 2 Jun. 9-11, 2003, pp. 1032-1036 vol. 2.*

Annabelle Van Zyl, Rene Spee, Alex Faveluke, and Shibashis Bhowmik; Voltage Sag Ride-Through for Adjustable-Speed Drives With Active Rectifiers; IEEE Transactions on Industry Applications; Nov./Dec. 1998; vol. 34, Issue No. 6.

Annette Von Jouanne, Prasad N. Enjeti, and Basudeb Banerjee; Assessment of Ride-Through Alternatives for Adjustable-Speed Drives; IEEE Transactions on Industry Applications; Jul./Aug. 1999; vol. 35, Issue No. 4.

* cited by examiner

RIDE-THROUGH METHOD AND SYSTEM FOR HVAC AND R CHILLERS

BACKGROUND OF THE INVENTION

The present invention relates generally to variable speed drives, and more specifically, to variable speed drives with voltage-sag ride through capability for use in heating, ventilation, air conditioning and refrigeration (HVAC&R) equipment.

Variable speed drives (VSDs) are used in HVAC&R systems to provide variable magnitude and variable frequency AC voltage to motors driving refrigeration compressors. VSDs are typically comprised of an input rectifier, a DC link and an inverter. Line AC voltage, supplied at a fixed magnitude and fixed frequency by an electric utility, is rectified by the VSDs input rectifier into a DC voltage. This DC voltage is filtered and stabilized by the passive components with energy storage capability (such as capacitors) at the DC link. The DC link voltage is then inverted to a variable magnitude, variable frequency AC voltage, which feeds the electrical load. In HVAC&R equipment, the electrical load is normally an electric motor coupled to a compressor. VSDs are particularly susceptible to undervoltage conditions, referred to as voltage sags, occurring on the utility supply input. Such voltage sags are reflected through to the DC link voltage and to the load unless corrected or compensated in other ways. The majority of line voltage sags occur for short durations, on the order of several milliseconds to a few seconds. Such voltage sags may cause the DC link voltage to sag, and the VSD system to shut down. The ability of a VSD to ride through a voltage sag without shutting down, and to resume operation after the input voltage is recovered, is considered advantageous in a VSD as it reduces the HVAC&R equipment's downtime. For VSDs based on voltage source inverter (VSI) technology, ride-through capability is typically achieved by maintaining the DC link voltage at or near the rated value. The VSD is then able to provide a sufficient voltage to drive the electric motor. Otherwise, if the DC link falls sufficiently below its rated value, the VSD and chiller control system will shut down to prevent irregular and potentially harmful motor or compressor operation.

The most common type of rectifier used in VSDs, however, is a passive rectifier. A passive rectifier typically includes a three-phase diode bridge. With a passive rectifier, the DC link voltage is directly proportional to the input line voltage. A passive rectifier therefore does not compensate for the variations in input line voltage. Consequently, a voltage sag will cause the DC link voltage to drop, which, in turn, may cause the VSD to shutdown.

When a passive rectifier is used in the VSD, one possible way of improving ride-through capability is to provide an additional source of power connected to the DC link, as described in Annette von Jouanne et al., Assessment of Ride-Through Alternatives for Adjustable-Speed Drives, 35 IEEE Transactions on Industry Applications 908 (1999), which is incorporated herein by reference. Such an additional source of power can be provided by additional capacitors, a DC boost converter, batteries, supercapacitors, motor-generator sets, flywheels, superconductive magnetic energy storage systems, fuel cells, etc. All of these require additional hardware and therefore significantly increase the cost of a VSD. A relatively inexpensive way of increasing the ride-through capability of a VSD with passive front end is to use the load inertia to generate power during a voltage sag (also described in Annette von Jouanne et al. cited above).

In order to achieve this way of increasing the ride through capability, the inverter output frequency during a voltage sag is adjusted to a value slightly below the motor load frequency. This causes the motor to act as a generator and to maintain the DC link voltage at a desired level. This method typically requires motor speed and current sensors, which may add to the cost of a VSD.

U.S. Pat. No. 6,686,718 describes various techniques of increasing the ride through capability of a VSD. For example, another possible way of increasing ride-through capability of a VSD is to use an Active Rectifier. Such a rectifier is able to compensate for the variations in the input line voltage, through the use of power devices capable of switching on and off the line currents, together with specialized control methods. The DC link voltage can therefore be kept at a value sufficiently large to prevent VSD shutdowns. This technique is described in Annabelle van Zyl et al., Voltage Sag Ride-Through for Adjustable-Speed Drives with Active Rectifiers, 34 IEEE Transactions on Industry Applications 1270 (1998), which is incorporated herein by reference.

One such Active Rectifier employs a pulse-width modulated (PWM) boost rectifier. The DC link voltage may be tightly regulated at a nominal value during a decrease or sag in the input line voltage. However, the input AC current of the boost rectifier increases as the line voltage decreases. Due to the practical current conduction and current switching limitations of the boost rectifier components, the input AC current cannot be allowed to increase indefinitely. Rather, it must be controlled (through boost rectifier control algorithms) so that it never exceeds a predetermined limit, which is referred to as the boost rectifier current limit. As long as the boost rectifier's input current is below or at the current limit, the boost rectifier's output DC voltage may be tightly controlled at a nominal setpoint. However, if the line voltage continues to drop after the current limit of the boost rectifier is reached, the boost rectifier is no longer capable of regulating the output DC voltage to the setpoint value although the input current remains controlled at the current limit level. As the inverter section of the VSD continues to draw current from the DC link capacitors to drive the motor at the same power level prior to the inception of the voltage sag, the energy stored in the DC link capacitors is transferred to the load, and the voltage of the DC link decreases. If this situation continues for a sufficient period of time, the DC link voltage will decrease below a predetermined fault threshold and the chiller system will eventually shut down.

Therefore what is needed is a method for increasing the ride-through capability of a VSD applied to an HVAC&R system beyond the current ride-through capability of state-of-the-art general purpose VSDs described above. This new method is based upon boosting and controlling the voltage of the DC link to maximize the period of VSD and HVAC&R system operational time during a voltage sag, capturing and maintaining the maximum amount of energy stored in the inertia of the rotating motor and compressor in order to preserve the energy in the DC link circuit, and utilizing the energy stored in the refrigerant and water circuits of the HVAC&R system to maximize the ride-through capability of the system during an input voltage sag.

SUMMARY OF THE INVENTION

The present invention discloses a method of providing ride-through capability in a VSD for an HVAC&R system, comprising a motor mechanically coupled with a compressor, and a variable speed drive for powering the motor. The variable speed drive includes an Active Rectifier stage and an inverter stage electrically coupled by a DC link stage. The line AC voltage, input AC current, DC link voltage, and motor AC current are all monitored and/or sensed by the system. The DC voltage of the DC link stage is regulated to a setpoint via the Active Rectifier during normal operation and during a voltage sag. The regulation of the DC voltage of the DC link stage is further transferred from the Active Rectifier stage to the inverter stage in response to the input current into the Active Rectifier stage reaching a predetermined current limit value, and the work done by the compressor in the refrigerant system is stopped. The DC voltage of the DC link stage is then controlled via the inverter by reversing the power flow from the motor to DC link. The control of the DC voltage of the DC link stage is transferred back to the Active Rectifier stage in response to the monitored line AC voltage recovering to a predetermined threshold voltage value.

In one aspect of the invention, there is disclosed a method for controlling a variable speed drive to ride-through a voltage sag, comprising the steps of providing a motor and a load mechanically coupled together; providing a variable speed drive to power the motor, the variable speed drive including an active converter stage and an inverter stage electrically coupled by a DC link stage; monitoring a DC voltage of the DC link stage; monitoring an input parameter of the active converter stage; regulating the DC voltage of the DC link stage with the active converter in response to a change in the monitored DC link voltage; transferring the regulation of the DC voltage of the DC link stage to the inverter stage in response to the DC voltage being less than a predetermined first threshold voltage; mechanically removing the load from the motor; and controlling the DC voltage of the DC link stage with the inverter stage by reversing power flow from the motor to the DC link stage. The method may further comprise the steps of monitoring an AC input voltage of an AC input power source; and transferring control of the DC voltage of the DC link stage to the active converter stage in response to the monitored AC voltage being equal to or greater than a predetermined threshold voltage value.

In another aspect the invention is directed to a method for increasing voltage sag ride-through capability in a chiller system, comprising the steps of providing a motor and a compressor mechanically coupled together; providing a variable speed drive to power the motor, the variable speed drive including an active converter stage and an inverter stage electrically coupled by a DC link stage; monitoring a DC voltage of the DC link stage; monitoring an input parameter of the active converter stage; regulating the DC voltage of the DC link stage through the active converter stage; regulating the motor speed through the inverter stage; transferring the regulation of the DC voltage of the DC link stage to the inverter stage in response to the DC voltage of the DC link stage being less than a predetermined first threshold voltage; mechanically unloading the compressor; disabling the active converter stage; and controlling the DC voltage of the DC link stage with the inverter stage by reversing power flow from the motor to the DC link.

A further aspect of the invention is directed to a method for increasing voltage sag ride-through capability in a chiller system, comprising the steps of providing a motor and a compressor mechanically coupled together; providing a variable speed drive to power the motor, the variable speed drive including an active converter stage and an inverter stage electrically coupled by a DC link stage; monitoring a DC voltage of the DC link stage; monitoring an input parameter of the active converter stage; regulating the DC voltage of the DC link stage through the active converter stage; regulating the speed of the motor through the inverter stage; transferring the regulation of the DC voltage of the DC link stage to the inverter stage in response to the DC voltage of the DC link stage being less than a predetermined first threshold voltage; mechanically unloading the compressor; regulating the DC voltage of the DC link stage through the inverter stage to a first voltage setpoint level by reversing power flow from the motor to the DC link; and additionally regulating the DC voltage of the DC link stage with the active converter stage to a second voltage setpoint level while the active converter stage is operating in a current limiting mode.

Yet another aspect the invention is directed to a method for controlling a variable speed drive to ride-through a voltage sag, comprising the steps of providing a motor and compressor mechanically coupled together; providing a variable speed drive to power the motor, the variable speed drive including a passive rectifier stage and an inverter stage electrically coupled by a DC link stage; monitoring a DC voltage of the DC link stage; monitoring an input parameter of the passive rectifier stage; stopping control of the motor with the inverter stage in response to the DC voltage being less than a predetermined first threshold voltage; mechanically unloading the compressor; and controlling the DC voltage of the DC link stage with the inverter stage by reversing power flow from the motor to the DC link. In this aspect of the invention, using a passive rectifier the DC link voltage is uncontrolled and simply a result of the rectification of the input AC line voltage.

The invention is also directed to a chiller system comprising a compressor, a condenser, and an evaporator connected in a closed refrigerant loop; a motor connected to the compressor to power the compressor; and a variable speed drive connected to the motor, the variable speed drive being configured to receive an input AC power at a fixed input AC voltage and a fixed input frequency and provide an output power at a variable voltage and variable frequency to the motor, the variable voltage having a maximum voltage greater in magnitude than the fixed input AC voltage and the variable frequency having a maximum frequency greater than the fixed input frequency, the variable speed drive comprising: a converter stage connected to an AC power source providing the input AC power, the converter stage being configured to convert the input AC voltage to a DC voltage; a DC link connected to the converter stage, the DC link being configured to filter the DC voltage and store energy from the converter stage; an inverter stage connected to the DC link, the inverter stage being configured to convert the DC voltage from the DC link into the output power for the motor having the variable voltage and the variable frequency; a control panel to control operation of the variable speed drive, the control panel being configured to regulate the DC voltage of the DC link stage with the inverter stage in response to the DC voltage being less than a predetermined first threshold voltage; wherein the control panel regulates the DC voltage of the DC link stage with the inverter stage by providing control signals to mechanically unload the compressor; and reverse power flow from the motor to the DC link stage to control the DC voltage of the DC link stage.

One advantage of the present invention is the ability to provide improved input voltage sag ride-through capabilities to prevent chiller system shut downs during input voltage sags.

Another advantage of the present invention is the ability to minimize the discharge of the DC link capacitors during a voltage sag, maintain the energy stored in the rotating mass of the motor and compressor through the mechanical unloading of the chiller system, relying upon the thermal storage capability of the refrigerant and chilled water or brine systems to maximize the thermal ride-through capability of the HVAC&R system.

Still another advantage of the present invention is the ability to reverse the flow of energy between rotating mass of the motor and compressor and the DC link, to supply energy to the DC link.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
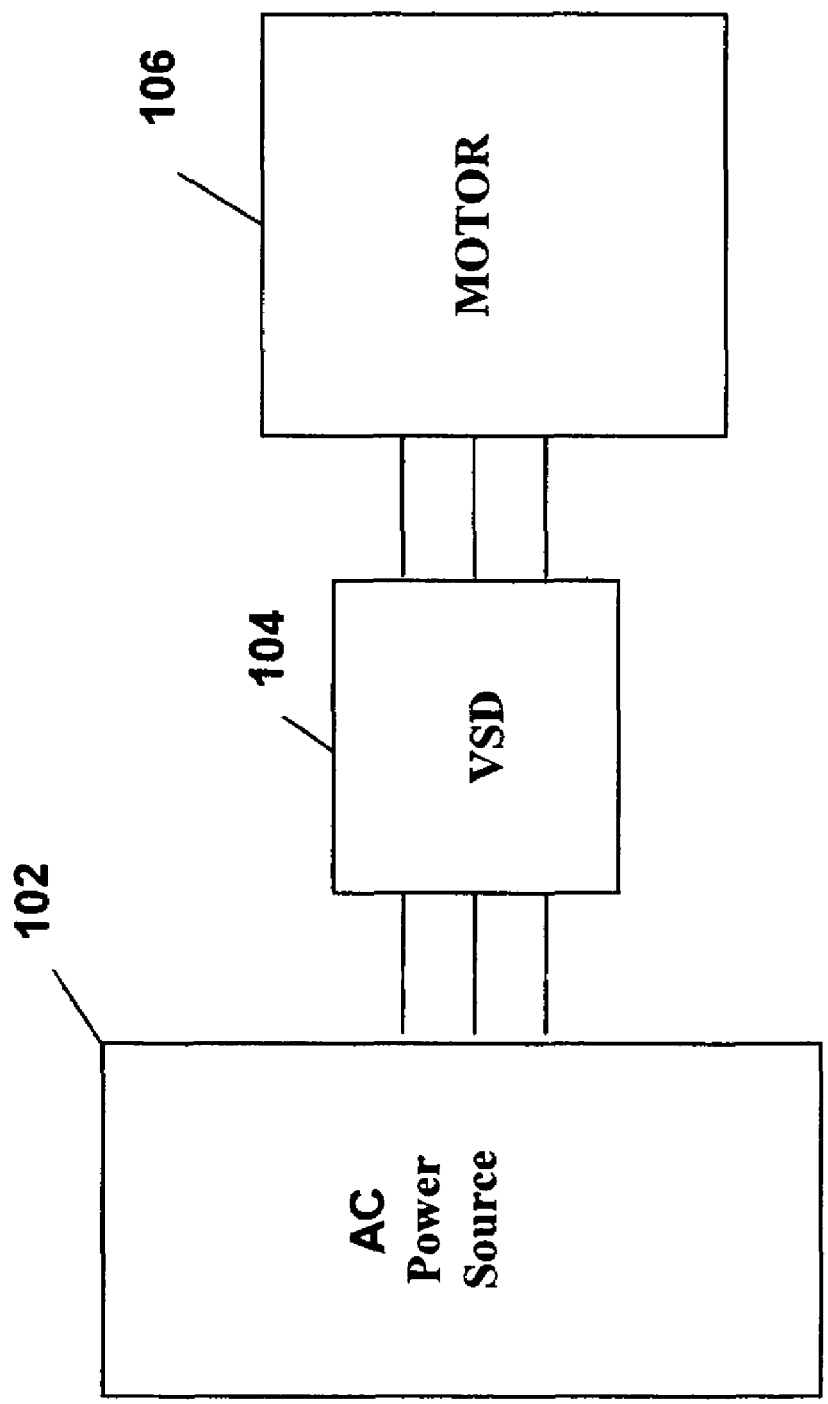
FIG. 1 illustrates schematically a general system configuration of the present invention.

FIG. 1 illustrates generally the system configuration of the present invention. An AC power source 102 supplies fixed voltage and frequency AC power to a variable speed drive (VSD) 104, which in turn, supplies variable voltage and frequency AC power to a motor 106. The motor 106 is preferably used to drive a corresponding compressor of a refrigeration or chiller system (see generally, FIG. 3). The AC power source 102 provides single phase or multi-phase (e.g., three phase), fixed voltage, and fixed frequency AC power to the VSD 104 from an AC power grid or distribution system that is present at a site. The AC power grid can be supplied directly from an electric utility or can be supplied from one or more transforming substations between the electric utility and the AC power grid. The AC power source 102 can preferably supply a three phase AC voltage or line voltage of 200 V, 230 V, 380 V, 460 V, or 575 V, at a line frequency of 50 Hz or 60 Hz to the VSD 104 depending on the corresponding AC power grid. It is to be understood that the AC power source 102 can provide any suitable fixed line voltage or fixed line frequency to the VSD 104 depending on the configuration of the AC power grid. In addition, a particular site can have multiple AC power grids that can satisfy different line voltage and line frequency requirements. For example, a site may have 230 VAC power grid to handle certain applications and a 460 VAC power grid to handle other applications.

Figure 2:
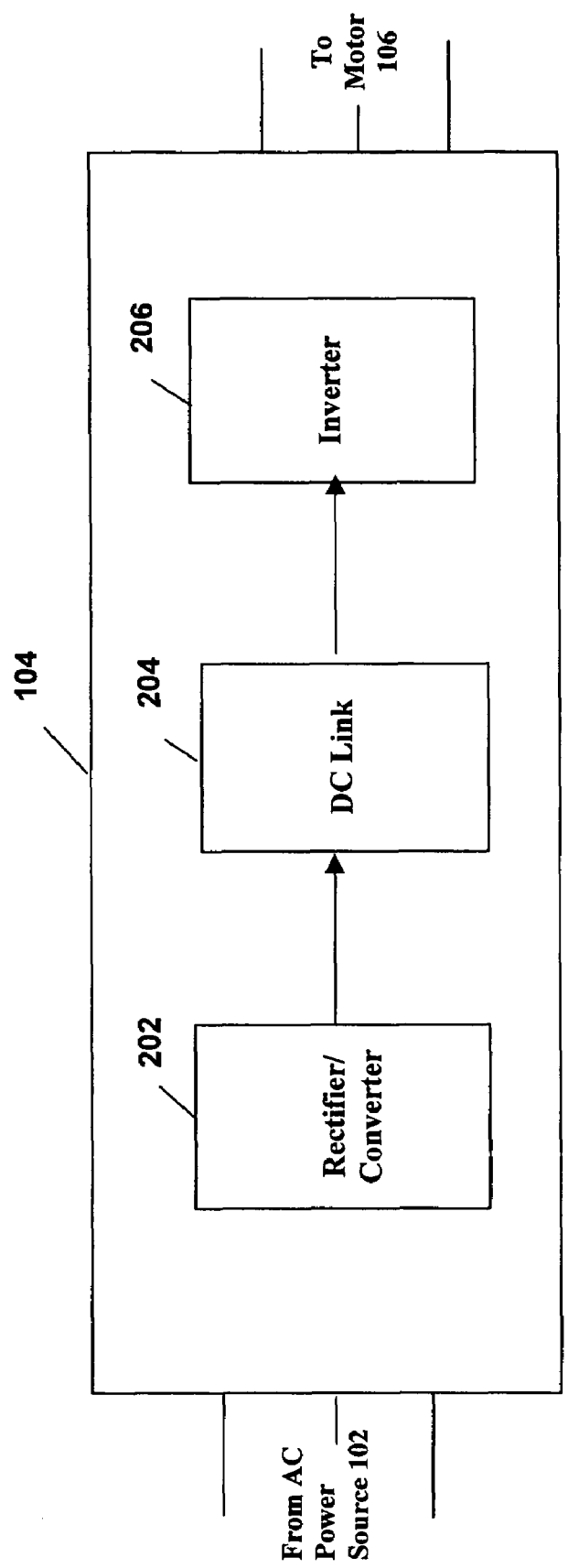
FIG. 2 illustrates schematically one embodiment of a variable speed drive used in the present invention.

The VSD 104 receives AC power having a particular fixed line voltage and fixed line frequency from the AC power source 102 and provides AC power to the motor 106 at a desired voltage and desired frequency, both of which can be varied to satisfy particular requirements. Preferably, the VSD 104 can provide AC power to the motor 106 having higher voltages and frequencies or lower voltages and frequencies than the fixed voltage and fixed frequency received from the AC power source 102. FIG. 2 illustrates schematically some of the components in one embodiment of the VSD 104. The VSD 104 can have three stages: a rectifier/converter stage 202, a DC link stage 204 and an inverter stage 206. The rectifier/converter 202 converts the fixed frequency, fixed magnitude AC voltage from the AC power source 102 into DC voltage. The DC link 204 filters the DC power from the converter 202 and provides energy storage components such as capacitors and/or inductors. Finally, the inverter 206 converts the DC voltage from the DC link 204 into variable frequency, variable magnitude AC voltage for the motor 106.

Since the VSD 104 can provide a variable output voltage and variable frequency to the motor 106, the motor can be operated at a variety of different conditions, for instance in constant flux or constant volts/Hz mode depending on the particular load of the motor. Preferably, a control panel, microprocessor or controller can provide control signals to the VSD 104 to control the operation of the VSD 104 and motor 106 to provide the optimal operational setting for the VSD 104 and motor 106, depending on the particular sensor readings received by the control panel. For example, in the refrigeration system 300 of FIG. 3, the control panel 308 can adjust the output voltage and frequency of the VSD 104 to correspond to changing conditions in the refrigeration system, i.e., the control panel 308 can increase or decrease the output voltage and frequency of the VSD 104 in response to increasing or decreasing load conditions on the compressor 302 in order to obtain a desired operating speed of the motor 106 and a desired output load of the compressor 302.

In a preferred embodiment, the rectifier/converter 202 is a three-phase pulse width modulated boost rectifier having insulated gate bipolar transistors (IGBTs) to provide a boosted DC voltage to the DC link 204 to obtain a maximum RMS output voltage from the VSD 104 greater than the input voltage of the VSD 104. In an alternate embodiment, the converter 202 can be a diode or thyristor rectifier, possibly coupled to a boost DC/DC converter to provide a boosted DC voltage to the DC link 204 in order to obtain an output voltage from the VSD 104 greater than the input voltage of the VSD 104. In another embodiment, the rectifier/converter 202 may be a passive diode or thyristor rectifier without voltage-boosting capability.

In a preferred embodiment of the present invention, the VSD 104 can provide output voltages and frequencies that are at least 1.04 times and 3 times the fixed voltage and fixed frequency, respectively, provided to the VSD 104. Furthermore, it is to be understood that the VSD 104 can incorporate different components from those shown in FIG. 2 so long as the VSD 104 can provide the motor 106 with appropriate output voltages and frequencies.

The VSD 104 can also include a precharge system (not shown) that can control the rise of the DC link voltage from 0 V to a value close to the peak of the AC line voltage to avoid a large inrush current in the VSD 104 when the AC voltage is first applied to the VSD 104, which inrush current can be damaging to the components of the VSD 104. The precharge system can include a precharge contactor that is used to connect precharge resistors between the input AC power source 102 and the rectifier/converter 202 or, sometimes, between the output of the rectifier/converter 202 and the DC link 204. These precharge resistors limit the inrush current to a manageable level. After the precharge is completed, the precharge resistors are excluded from the circuit by opening the precharge contactor, and the input AC power source 102 is connected directly to the converter 202 by the closing of another contactor, referred to as the supply contactor. The supply contactor remains closed during the operation of the system. Alternately precharge means may be incorporated into the design of the rectifier/converter 202, through the use of the appropriate power semiconductor devices, coupled together with the appropriate precharge control means.

In addition, the VSD 104 can provide the HVAC&R system with power having about a unity power factor. Finally, the ability of the VSD 104 to adjust both the voltage and frequency received by the motor 106 to be higher or lower than the fixed line voltage and fixed line frequency received by the VSD 104, permits the HVAC&R system to be operated on a variety of foreign and domestic power grids without having to alter the motor 106 or the VSD 104 for different power sources.

The motor 106 is preferably an induction motor that is capable of being driven at variable speeds. The induction motor can have any suitable pole arrangement including two poles, four poles or six poles. The induction motor is used to drive a load, preferably a compressor of a refrigeration system as shown in FIG. 3.

Figure 3:
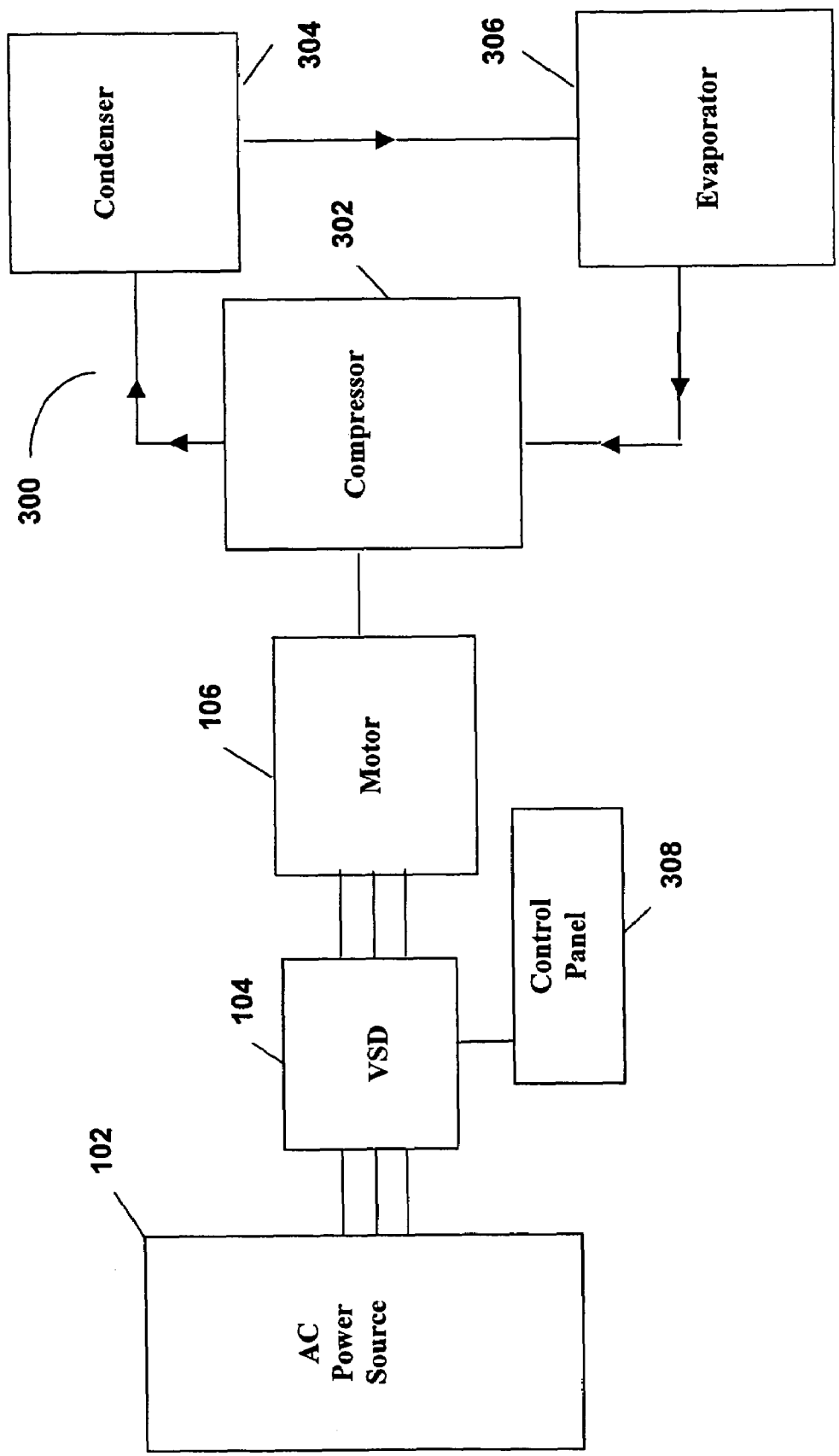
FIG. 3 illustrates schematically a refrigeration system that can be used with the present invention.

As shown in FIG. 3, the HVAC, refrigeration or liquid chiller system 300 includes a compressor 302, a condenser 304, an evaporator 306, and a control panel 308. The control panel 308 can include a variety of different components such as an analog to digital (A/D) converter, a microprocessor, a non-volatile memory, and an interface board, to control operation of the refrigeration system 300. The control panel 308 can also be used to control the operation of the VSD 104 and the motor 106. The conventional refrigeration system 300 includes many other features that are not shown in FIG. 3. These features have been purposely omitted to simplify the drawing for ease of illustration.

Compressor 302 compresses a refrigerant vapor and delivers the vapor to the condenser 304 through a discharge line. The compressor 302 is preferably a centrifugal compressor, but can be any suitable type of compressor, e.g., screw compressor, reciprocating compressor, etc. The refrigerant vapor delivered by the compressor 302 to the condenser 304 enters into a heat exchange relationship with a fluid, e.g., air or water, and undergoes a phase change to a refrigerant liquid as a result of the heat exchange relationship with the fluid. The condensed liquid refrigerant from condenser 304 flows through an expansion device (not shown) to an evaporator 306.

The evaporator 306 can include connections for a supply line and a return line of a cooling load. A secondary liquid, e.g., water, ethylene, calcium chloride brine or sodium chloride brine, travels into the evaporator 306 via return line and exits the evaporator 306 via supply line. The liquid refrigerant in the evaporator 306 enters into a heat exchange relationship with the secondary liquid to lower the temperature of the secondary liquid. The refrigerant liquid in the evaporator 306 undergoes a phase change to a refrigerant vapor as a result of the heat exchange relationship with the secondary liquid. The vapor refrigerant in the evaporator 306 exits the evaporator 306 and returns to the compressor 302 by a suction line to complete the cycle. It is to be understood that any suitable configuration of condenser 304 and evaporator 306 can be used in the system 300, provided that the appropriate phase change of the refrigerant in the condenser 304 and evaporator 306 is obtained.

The HVAC, refrigeration or liquid chiller system 300 can include many other features that are not shown in FIG. 3. These features have been purposely omitted to simplify the drawing for ease of illustration. Furthermore, while FIG. 3 illustrates the HVAC, refrigeration or liquid chiller system 300 as having one compressor connected in a single refrigerant circuit, it is to be understood that the system 300 can have multiple compressors, powered by a single VSD, connected into each of one or more refrigerant circuits.

The control panel 308 incorporates a compressor control unit 406 (see FIG. 4) that determines and implements the position of a mechanical loading device for the compressor, for example, the pre-rotation vanes in a centrifugal compressor or the slide valve in a screw compressor. The control panel 308 also controls the speed of the compressor 302 and the motor 106, in response to cooling demand signals generated by the control panel 308 for the chiller system. The control panel 308 sends the motor speed command to the inverter control unit 404 (see FIG. 4.), which controls the inverter 206 to output the voltage and frequency to the motor 106 to produce the desired compressor speed. The inverter control unit 404 preferably uses a vector control algorithm to control the speed of the motor 106 via direct torque control, by separately and independently controlling flux-producing and torque-producing components of the motor current.

In the following control descriptions, the DC link voltage, $V_{DC}$, DC link voltage first setpoint, $V_{STPT1}$, DC link voltage first threshold $V_{TH1}$, DC link voltage second setpoint $V_{STPT2}$ and DC link voltage cutout threshold $V_{UNDER}$, are DC values, where $V_{STPT1} > V_{TH1} > V_{STPT2} > V_{UNDER}$ and the sensed input AC line voltage $V_{INAC}$ and input AC voltage threshold $V_{TH\_IN}$ are RMS values. The preferred method of the present invention generally comprises a two-step operating mode to provide ride-through during a voltage sag at the input to the VSD 104. In the first step, as the magnitude of the AC line voltage decreases, the rectifier/converter 202 (in this embodiment a boost rectifier) regulates the DC link voltage to its rated value, as if under normal full voltage operation. The boost rectifier compensates for the input AC voltage sag by increasing the input AC current into the boost rectifier, to maintain the DC link voltage at its setpoint ($V_{STPT1}$). The boost rectifier continues to compensate for the sag in voltage by increasing the input current until it reaches a predetermined current limit. When the boost rectifier reaches the predetermined current limit, if the line voltage has not recovered to an acceptable level, the second step of the method commences as two substantially simultaneous responses, first by unloading the compressor and second by supplying power to the DC link from the stored energy in the rotating mass of the motor and compressor.

Figure 4:
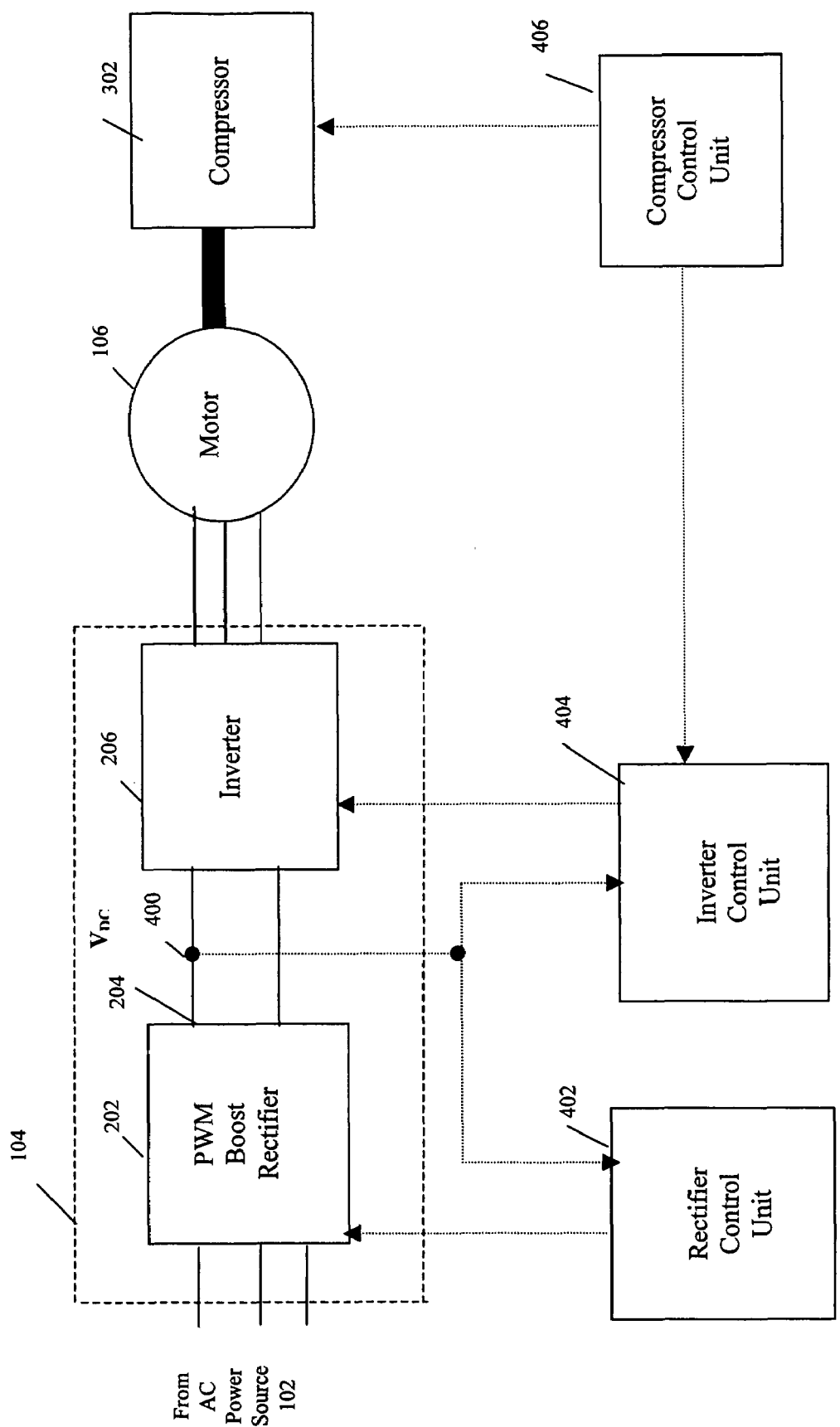
FIG. 4 illustrates a simplified block diagram of the invention.

Referring to FIG. 4, the compressor control unit 406 actuates the mechanical unloading device of the compressor 302 to minimize the power consumed by the refrigeration load from the DC link capacitors and the inertia of the rotating mass of the motor rotor and compressor. While the mechanical load is being uncoupled by the compressor control unit 406 in order to conserve the energy stored in the rotating masses, the inverter control unit 404 switches from the motor speed control mode to DC link voltage control mode and controls the magnitude of the DC link voltage to a level of $V_{STPT2}$ by controlling the motor speed. During the duration of the voltage sag the command received from the control panel, microprocessor or controller 308 to provide the optimal operational setting for the VSD 104 and motor 106 depending on the particular sensor readings received by the control panel 308 is ignored by the VSD 104. This forces the motor 106 and compressor 302 to act as a generator which causes the necessary amount of energy stored in their inertia to be transferred to the DC link capacitors. The rotor speed of the motor 106 decreases during the ride-through, while the DC link voltage is maintained at $V_{STPT2}$. If the energy stored in the rotating mass continues to deplete prior to the restoration of the line input voltage to normal range, the DC link voltage will drop below a predetermined threshold, denoted as $V_{UNDER}$, and the system will shut down.

In a system where multiple inverters and compressor motors are connected to the same DC link, the inverter control unit(s) operates in a similar fashion as explained above for the single inverter case. The main difference is in the fact that each inverter may have its own threshold $V_{TH1}$ (e.g. $V_{TH1a}$, $V_{TH1b}$, $V_{TH1c}$, where a, b, c stand for different inverters) and its own setpoint $V_{SPT2}$ (e.g. $V_{SPT2a}$, $V_{SPT2b}$, $V_{SPT2c}$). This separation of threshold values and setpoint values among different inverters and compressor motors is needed in order to prevent potential instability when multiple inverters try to control the DC link voltage at the same time.

The VSD includes an Active Rectifier 202 which may be a pulse width modulated boost rectifier or other boost rectifier type. The DC link stage 204 provides a control signal $V_{DC}$ at a node 400, which is transmitted to the rectifier control unit 402 and the inverter control unit 404. Control units 402 and 404 also receive other control signals in addition to the DC link voltage, which are omitted in this Figure for ease of illustration. Control units 402 and 404 are typically located inside the VSD cabinet, but may be located within the control panel 308, or may be separately mounted on the respective equipment.

Figure 5A:
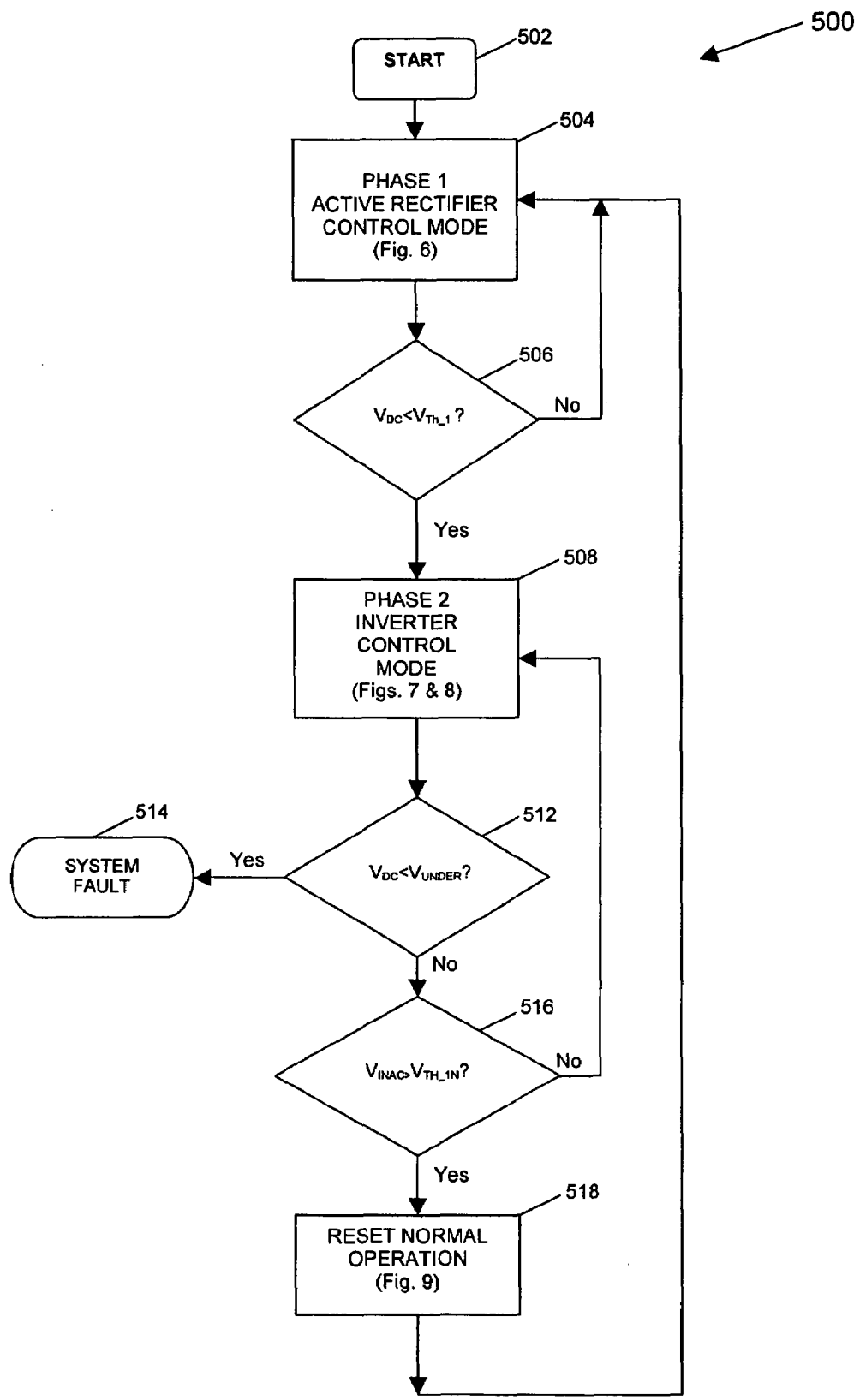
FIG. 5A illustrates a flow diagram of an embodiment of the present invention.
Figure 6:
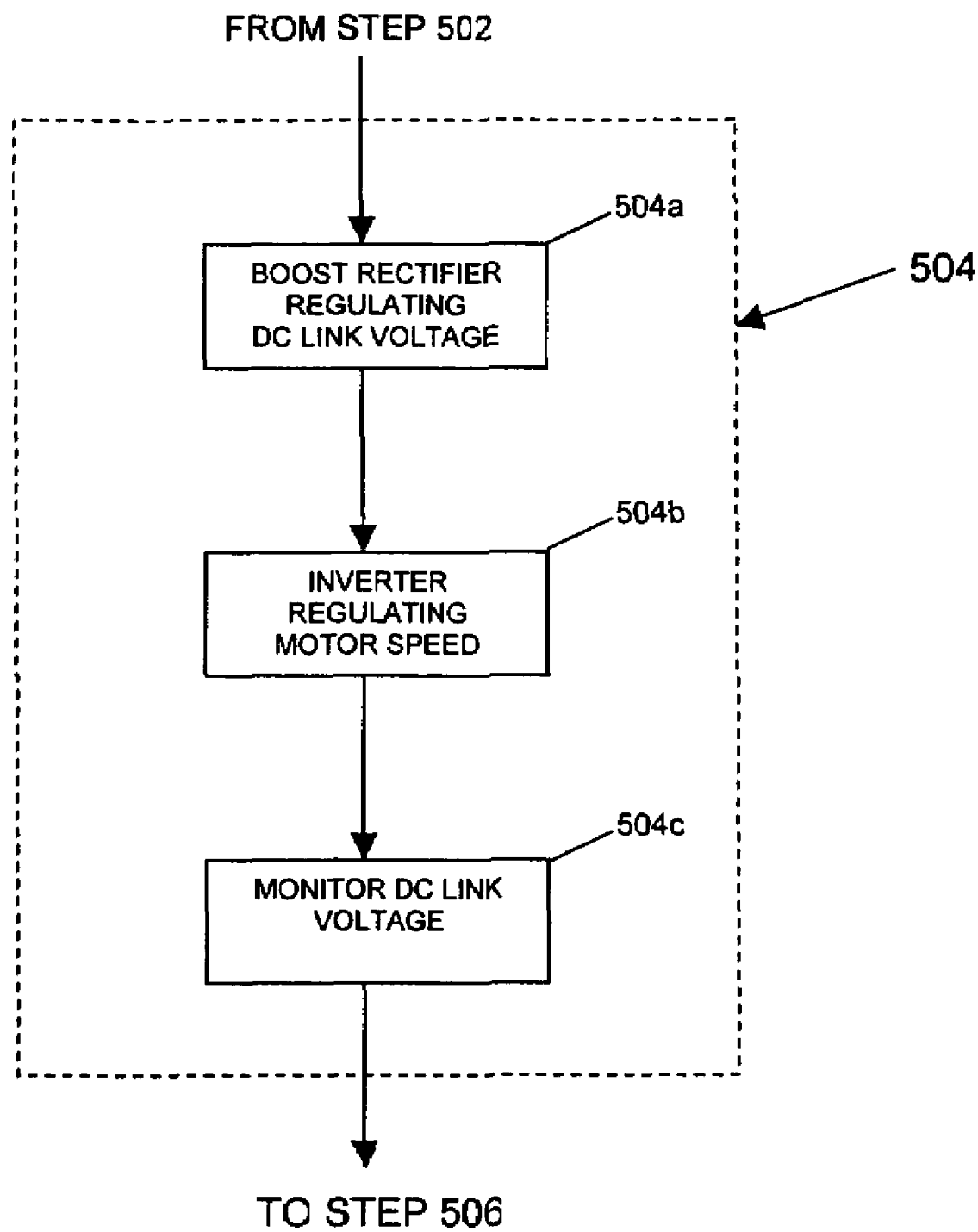
FIGS. 6 through 9 illustrate portions of the flow diagram shown in FIG. 5A.

One embodiment of the ride-through method of the present invention is shown in FIG. 5A. A flow diagram 500 generally illustrating one aspect of the method of the present invention begins in step 502 representing the system initialization. After the system is initialized it runs in normal operation as shown in step 504 provided the line voltage from the AC power source is near the nominal line voltage—i.e., no voltage sag—or the line voltage is beginning to sag below the nominal line voltage but the input current into the boost rectifier is below the current limit value and the DC link voltage is maintained at the setpoint $V_{STPT1}$. The boost rectifier is regulating the DC link voltage in step 504a; the inverter continues as normal to regulate the speed of the compressor in step 504b; and monitoring of the DC link voltage is performed by the control hardware and software in step 504c (See FIG. 6). Steps 504a–504c may be carried out concurrently or in sequence as shown in step 504. The order indicated in FIG. 6 is for illustrative purposes only. The input current of the boost rectifier is equal to or less than the RMS current limit value of the boost rectifier in step 504.

In step 506, $V_{DC}$ is compared to a predetermined threshold value $V_{TH1}$. The magnitude of $V_{TH1}$ is less than the nominal setpoint of the DC link voltage $V_{STPT1}$. As an example, if the nominal DC link voltage is $V_{STP1}$=950 V, $V_{TH1}$ could be selected as 900 V. If $V_{DC}$ is less than $V_{TH1}$, this indicates that boost rectifier has reached its current limit and is no longer capable of regulating the DC link voltage to its setpoint value, and hence the system proceeds to step 508 (FIGS. 7 & 8) to unload the compressor 302, disable the boost rectifier 202 and precharge devices, and transition the inverter 206 to control the DC link voltage; Otherwise, the system returns to step 504. Monitoring of the DC link voltage $V_{DC}$ may be performed continuously or in sequence, and is indicated as a discrete step herein if a change in the value of $V_{DC}$ triggers a response in the system.

Figure 7:
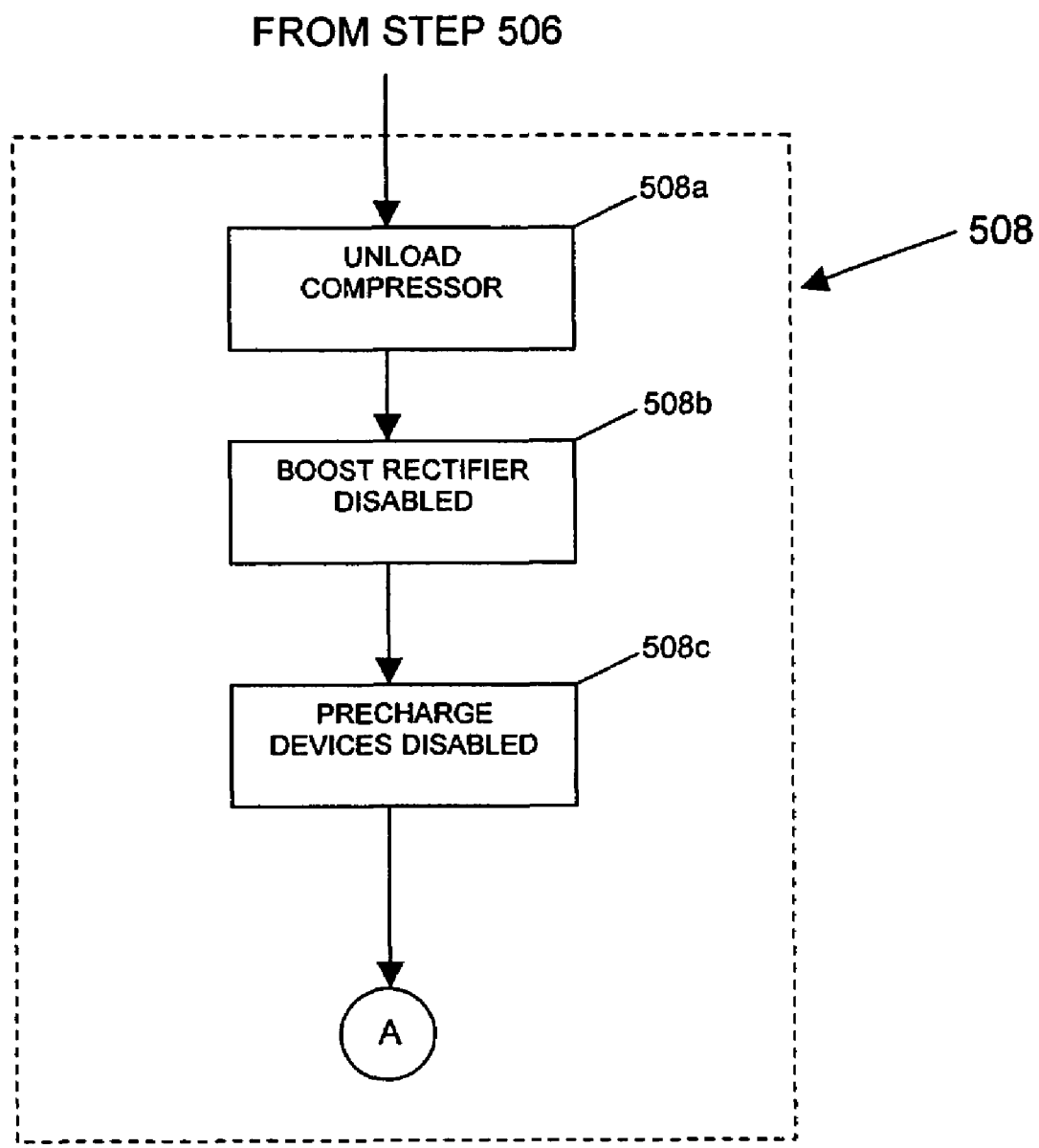

Steps 508a–508c are carried out in Step 508 as illustrated in FIG. 7. The compressor control unit 406 mechanically unloads the compressor in step 508a through actuation of the vanes in a centrifugal compressor or through the actuation of a slide valve in a screw compressor. By unloading the compressor, the stored rotational energy in the motor is conserved for the ride through operation, as described below, and minimal rotational energy is expended to the refrigerant load of the chiller system 300. During the brief ride-through period the thermal energy stored in the refrigerant loop and secondary evaporative cooling loop is used to provide the necessary cooling to the HVAC&R system load. At approximately the same time, in step 508b, the IGBTs in the boost rectifier are disabled, and in step 508c the precharge devices associated with the boost rectifier are disabled. The system is now in the second stage of Phase 2 ride-through operation, described in steps 510a–510c. Steps 508a–508c may be carried out concurrently or sequentially.

Figure 8:
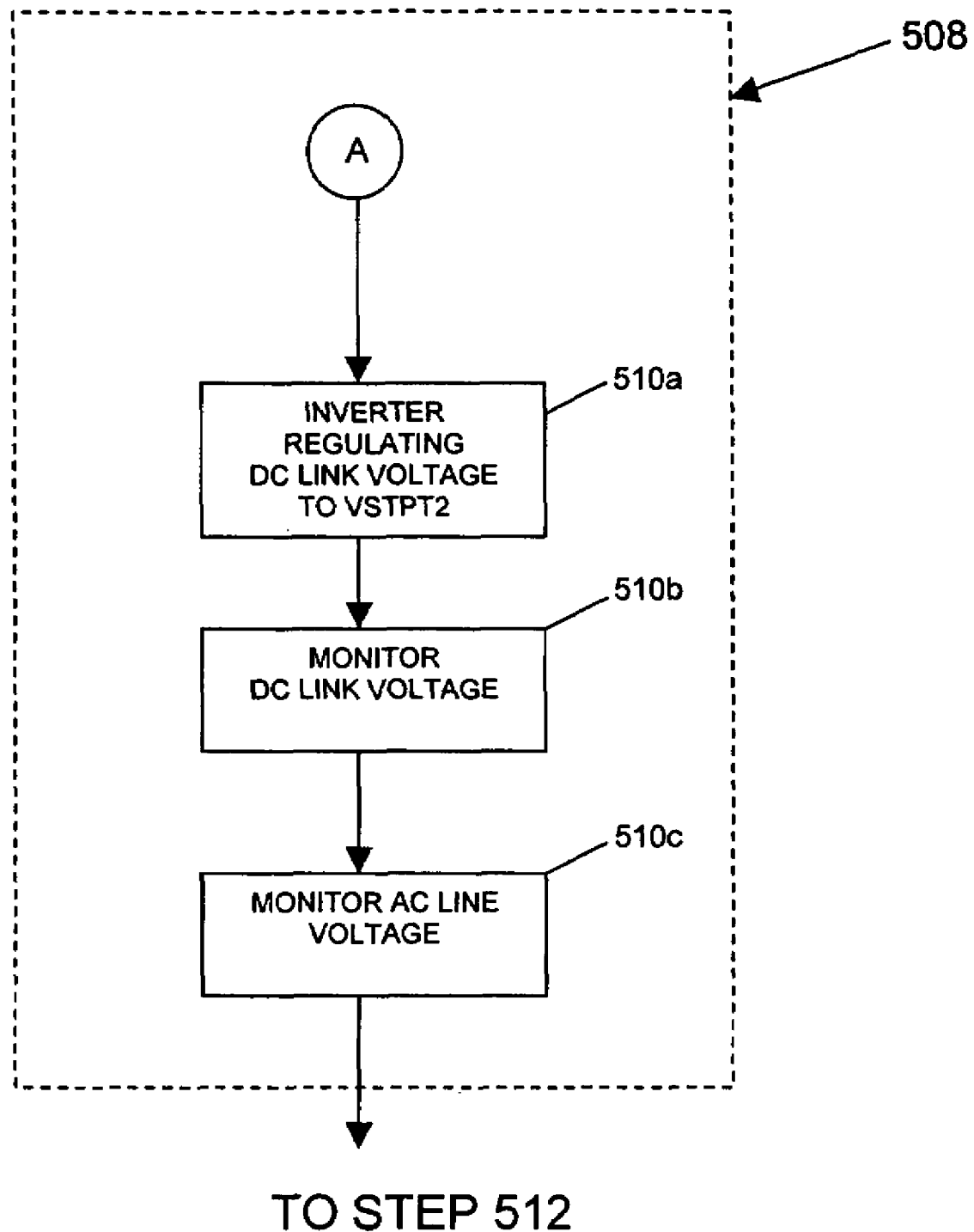

Steps 510a–510c are also carried out in step 508. Referring to FIG. 8, in step 510a the inverter is striving to regulate the DC link voltage to a nominal value $V_{STP2}$. The value chosen for $V_{STPT2}$ is lower than the value chosen for $V_{TH1}$. As an example, if $V_{TH1}$ is 900 V, $V_{STPT2}$ may be 850 V. The inverter is operated as a rectifier by the inverter control unit 404. The energy stored in the rotating mass of the motor 106 and compressor 302 flows in the reverse direction from normal motor operation, through the inverter 206 to the DC link 204. The motor 106 and compressor 302 effectively become a generator supplying power to the DC link. In this way, the DC link voltage is supported by energy stored in the electro-mechanical load comprising the motor 106 and compressor 302. Capacitors (not shown) that are connected to the DC link for storing electrical energy are maintained in a charged state by the energy flowing through the inverter 206 from the motor 106. In this embodiment of the present invention, in step 508b, the boost rectifier is disabled, so that all of the energy supplied to the DC link is provided through the inverter from the stored energy in the motor 106 and compressor 302. The DC link 204 is thus isolated from the input power source, and control hardware and software monitor the DC link voltage $V_{DC}$ in step 510b, and the input line voltage $V_{INAC}$ in step 510c. Steps 510a–510c may be carried out concurrently or sequentially in step 508, and the order indicated in FIG. 8 is for illustration purposes only. Step 508 continues until one of the following occurs in steps 512 or 516 shown in FIG. 5A.

Figure 9:
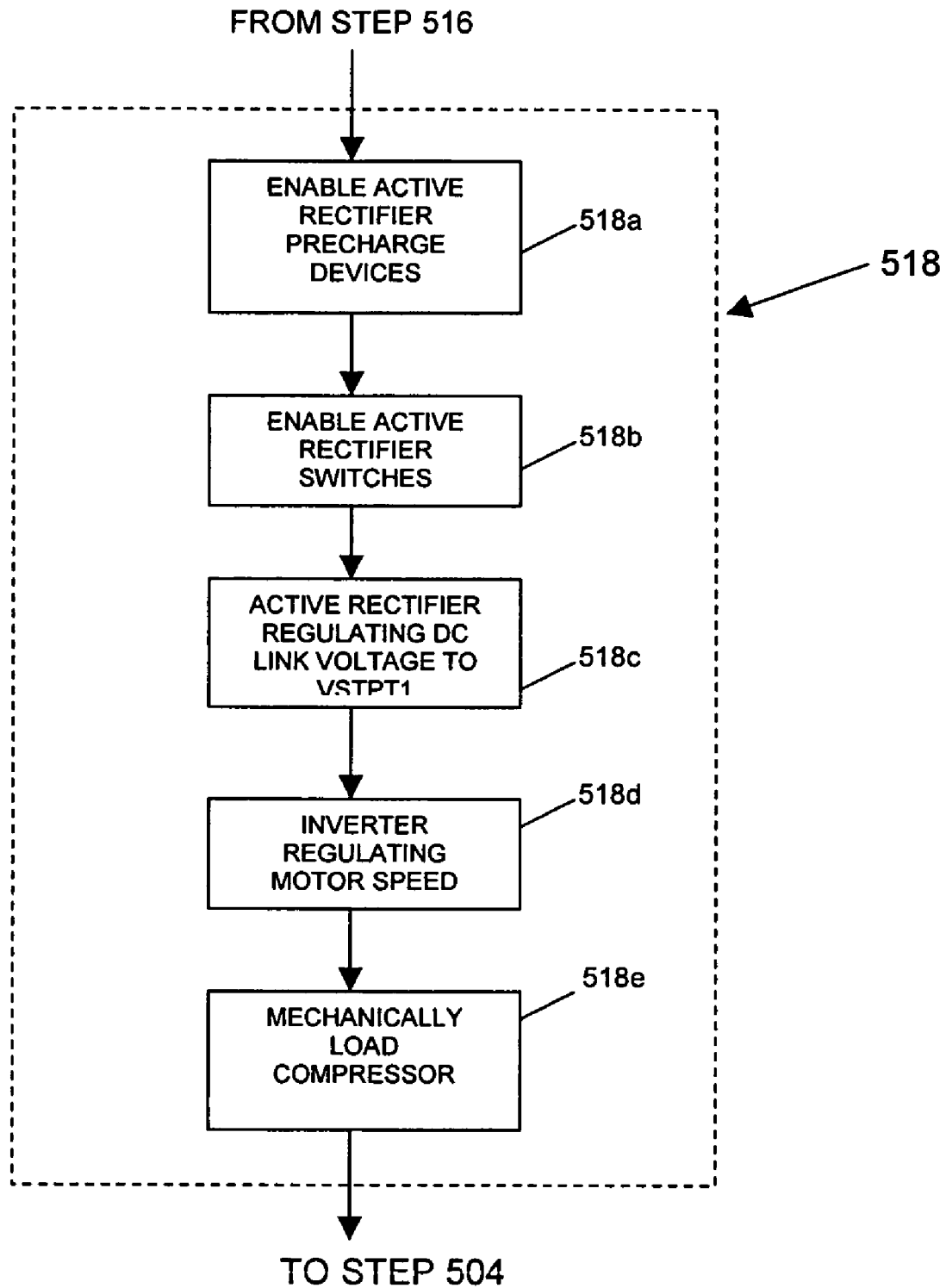

In step 512, the DC link voltage $V_{DC}$ is being continuously monitored, and if $V_{DC}$ decreases below a predetermined fault threshold voltage $V_{UNDER}$ (which is lower than $V_{STPT2}$), a system fault is indicated. The VSD is immediately shut down in step 514. Otherwise, the system proceeds to step 516, in which the input line voltage $V_{INAC}$ is monitored at the input power source. If $V_{INAC}$ is greater than the predetermined input line threshold voltage $V_{TH\_IN}$, this indicates that the voltage sag condition no longer exists, and the system proceeds to step 518 to reset the system to normal operation. As shown in FIG. 9, steps 518a–518e are carried out in step 518. In step 518a, precharge devices at the front end of the VSD are enabled to control the increase of the DC link voltage. In steps 518b and 518c, the boost rectifier switches are enabled to further increase the DC link voltage to a predetermined value $V_{STPT1}$. In step 518d inverter control mode is transferred back to controlling the speed of the motor from the command received from the control panel, microprocessor or controller to provide the optimal operational setting for the VSD 104 and motor 106 depending on the particular sensor readings received by the control panel, and the DC link is again controlled by the rectifier control unit 402. Finally, in step 518e, the compressor is mechanically loaded. The system then resumes regular operation in step 504.

Figure 5B:
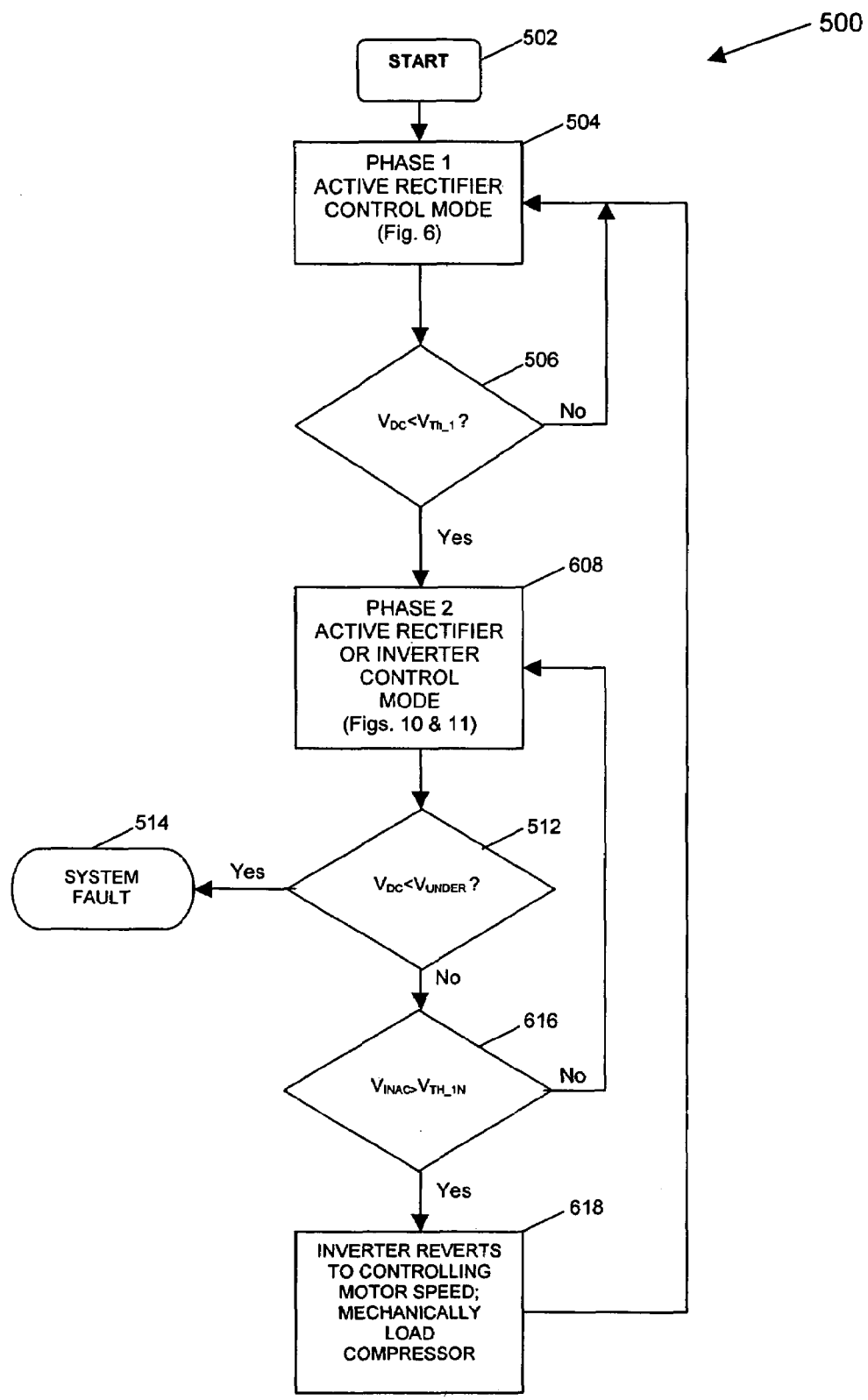
FIG. 5B illustrates a flow diagram of a preferred embodiment of the present invention.

Referring to FIG. 5B, the preferred embodiment for the ride-though sequence is now described. In this aspect of the invention, the boost rectifier remains enabled during the entire ride-through, supplying current to the capacitors of the DC link 202 concurrently with the regeneration of energy from the motor 106. The initial steps 502 through 506 of this alternate method remain the same as illustrated in FIGS. 5A and 6, discussed above. In the alternate method of the present invention, if $V_{DC}$ is less than $V_{TH1}$, in step 506, the system proceeds to step 608; otherwise, the system returns to step 504. As an example, if the nominal DC link voltage is $V_{STP1}$=950 V, $V_{TH1}$ could be selected as 900 V. Steps 508, 516 and 518 are replaced by steps 608, 616 and 618 as described below.

Figure 10:
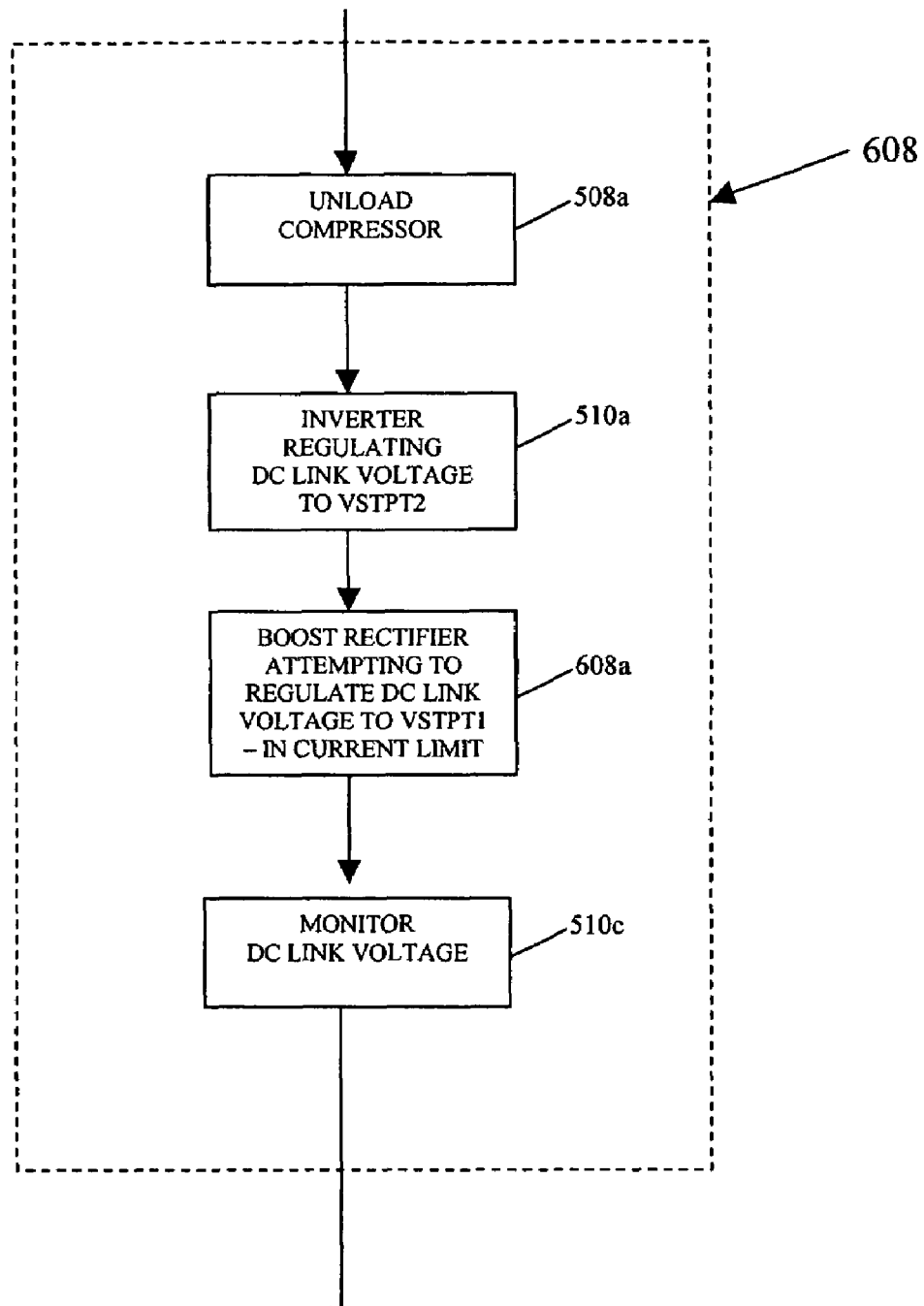
FIG. 10 illustrates portions of the flow diagram of FIG. 5B.

Steps 508a, 510a, 608a and 510c are carried out in step 608 shown in FIG. 10. In step 508a, the compressor control unit 406 mechanically unloads the compressor in the same manner described above. In step 510a the inverter control unit 404 begins to regulate the DC link voltage $V_{DC}$ to the value $V_{STP2}$ and stops regulating the speed of the compressor motor 106 by ignoring the command received from the control panel, microprocessor or controller that provides the optimal operational setting for the VSD 104 and motor 106 depending on the particular sensor readings received by the control panel. The value chosen for $V_{STP2}$ is lower than the value chosen for $V_{TH1}$. As an example, if $V_{TH1}$ is 900 V, $V_{STP2}$ may be 850 V. In step 608a, the boost rectifier continues to strive to regulate the DC link to the value $V_{STPT1}$ operating in current limit, in contrast with the method set forth in FIG. 7. Steps 508a, 510b and 510c may be carried out concurrently or sequentially in step 608, and the order indicated in FIG. 10 is for illustration purposes only.

In step 510a the inverter is operating as a rectifier to regulate the DC link voltage to a predetermined value $V_{STPT2}$. The DC link voltage is supported both by the energy conducted through the rectifier/converter and by the energy stored in the electromechanical load comprising the motor 106 and compressor 302. In this preferred embodiment, in step 608a, the boost rectifier remains active at its current limit and is also striving to regulate the DC link voltage, but to the higher setpoint value of $V_{STPT1}$. The operation in current limit prevents the boost rectifier from actually being able to achieve $V_{STPT1}$ at its output. When the input AC voltage rises to a sufficient magnitude the Active Rectifier can supply sufficient energy to permit $V_{STPT1}$ be achieved. In other words, the boost rectifier's voltage control loop is saturated when operating in current limit (which prevents system instability when both the boost rectifier and the inverter operate in closed loop trying to control DC link voltage), but power continues to flow from the input AC line into the DC link. Thus power is supplied to the DC link stage from both the input voltage source through the converter, and from the load through the inverter, permitting the maximum energy to be retained during the voltage sag and thus maximizing the ride-through capability of the system. The alternate method proceeds to step 512 as described in FIG. 5A above and also shown in FIG. 5B, until reaching step 616. In step 616 the DC link voltage $V_{DC}$ is compared with the $V_{TH1}$ limit and a decision is made to either continue to loop back to Phase 2 operation or cease ride-through operation at step 618. If $V_{DC}$ is greater than $V_{TH1}$, the Active Rectifier is no longer operating in current limit, which indicates that the input line voltage has recovered to within a predetermined percentage of the rated line voltage and the inverter control unit has reverted back to controlling the speed of the motor 106 in accordance with the command received from the control panel, microprocessor or controller that provides the optimal operational setting for the VSD 104 and motor 106 depending on the particular sensor readings received by the control panel. In step 618 the compressor 302 is mechanically loaded. The system then resumes regular operation in step 504.

While it is preferred that the control algorithm be embodied in a computer program(s) and executed by a microprocessor located in the VSD 104, it is to be understood that the control algorithm may be implemented and executed using digital and/or analog hardware by those skilled in the art. If hardware is used to execute the control algorithm, the corresponding configuration of the VSD 104 can be changed to incorporate the necessary components and to remove any components that may no longer be required.

In yet another method according to the present invention, the converter 202 of the VSD 104 may be a passive rectifier—i.e., a diode or thyristor rectifier for converting the AC input power to DC power for the DC link stage. While the method of using a passive rectifier/converter 202 provides less ride through capability than the active rectifier/converter method, there is still an improved ride through achieved as a result of the unloading of the refrigerant load and the regeneration of energy from the motor/compressor load to the DC link 204. When a passive rectifier is used, the method described in FIG. 5 is implemented, with ride through effectively beginning in step 508, wherein the DC link voltage has decayed below the threshold voltage $V_{TH1}$. In FIG. 7 step 508b, and in FIG. 9 step 518b, action is taken toward the passive rectifier rather than an active rectifier. In this case the DC link voltage cannot be controlled to a specific setpoint such as $V_{STP1}$ through the input converter, but rather the DC link voltage magnitude is a function of the passive rectification of the input AC line voltage. In this case the magnitude of $V_{TH1}$ is chosen to be at a level that is lower than the minimum expected DC voltage resulting from rectification of the input line voltage, over the operating input voltage range of the system. $V_{STPT2}$ is chosen to be less than $V_{TH1}$ and the inverter control unit 404 regulates the DC link voltage $V_{DC}$ to the value $V_{STPT2}$ during the voltage sag.

The system and method of the present invention does not require the sensing of motor speed to monitor and respond to voltage sag conditions, which reduces the cost and increases the reliability of the system. The control is achieved through sensing of the DC link voltage, input AC line voltage, input currents and motor currents.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for controlling a variable speed drive to ride-through a voltage sag, comprising the steps of:
   providing a motor and a load mechanically coupled together;
   providing a variable speed drive to power the motor, the variable speed drive including an active converter stage and an inverter stage electrically coupled by a DC link stage;
   monitoring a DC voltage of the DC link stage;
   monitoring an input parameter of the active converter stage;
   regulating the DC voltage of the DC link stage with the active converter in response to a change in the monitored DC link voltage;
   transferring the regulation of the DC voltage of the DC link stage to the inverter stage in response to the DC voltage being less than a predetermined first threshold voltage;
   mechanically removing the load from the motor; and
   controlling the DC voltage of the DC link stage with the inverter stage by reversing power flow from the motor to the DC link stage.

2. The method of claim 1, further comprising the steps of:
   monitoring an AC input voltage of an AC input power source; and
   transferring control of the DC voltage of the DC link stage to the active converter stage in response to the monitored AC voltage being equal to or greater than a predetermined threshold voltage value.

3. The method of claim 2, wherein the step of transferring the regulation of the DC voltage of the DC link stage to the inverter stage also includes the steps of disabling the active converter stage to isolate the DC link stage from the AC input power source.

4. The method of claim 2, wherein the step of controlling the DC voltage with the inverter stage also includes controlling the DC voltage of the DC link stage with the active converter stage while the active converter stage is in current limiting mode.

5. The method of claim 2, wherein the step of regulating the DC voltage of the DC link includes increasing an input current through the active converter stage in response to a decrease in AC line voltage up to a predetermined current limit value.

6. The method of claim 1, wherein the step of regulating the DC voltage of the DC link stage with the active converter in response to a change in the monitored DC link voltage includes regulating the DC voltage of the DC link stage to a first DC link voltage setpoint, and the step of controlling the DC voltage of the DC link stage with the inverter stage includes controlling the DC voltage of the DC link stage to a second DC link voltage setpoint in response to a change in the monitored DC link voltage.

7. A method for increasing voltage sag ride-through capability in a chiller system, comprising the steps of:
   providing a motor and a compressor mechanically coupled together;
   providing a variable speed drive to power the motor, the variable speed drive including an active converter stage and an inverter stage electrically coupled by a DC link stage;
   monitoring a DC voltage of the DC link stage;
   monitoring an input parameter of the active converter stage;
   regulating the DC voltage of the DC link stage through the active converter stage;
   regulating the motor speed through the inverter stage;
   transferring the regulation of the DC voltage of the DC link stage to the inverter stage in response to the DC voltage of the DC link stage being less than a predetermined first threshold voltage;
   mechanically unloading the compressor;
   disabling the active converter stage; and
   controlling the DC voltage of the DC link stage with the inverter stage by reversing power flow from the motor to the DC link.

8. The method of claim 7, also comprising the step of shutting down the chiller system in response to the DC voltage of the DC link stage being less than a predetermined second threshold voltage.

9. The method of claim 7, wherein the monitored input parameter comprises an AC input voltage and the method also includes the step of returning a system control mode to a normal operation mode in response to the AC input voltage exceeding a predetermined input voltage threshold.

10. The method of claim 7, wherein the active converter stage includes at least one precharge device, and the method further comprises the step of disabling the at least one precharge device in response to the DC voltage of the DC link stage being less than a predetermined first threshold voltage.

11. The method of claim 10 wherein the step of returning the system control mode to normal operation mode comprises:
   enabling the at least one precharge device and the active converter stage;
   regulating the DC voltage of the DC link stage through the active converter stage;
   regulating the motor speed through the inverter stage; and
   mechanically loading the compressor.

12. The method of claim 7, wherein the step of regulating the DC voltage of the DC link stage with the active converter stage in response to a change in the monitored DC link voltage comprises regulating the DC voltage of the DC link stage to a first DC link voltage setpoint, and the step of controlling the DC voltage of the DC link stage with the inverter stage further comprises controlling the DC voltage of the DC link stage to a second DC link voltage setpoint in response to a change in the monitored DC link voltage.

13. A method for increasing voltage sag ride-through capability in a chiller system, comprising the steps of:
   providing a motor and a compressor mechanically coupled together;
   providing a variable speed drive to power the motor, the variable speed drive including an active converter stage and an inverter stage electrically coupled by a DC link stage;
   monitoring a DC voltage of the DC link stage;
   monitoring an input parameter of the active converter stage;
   regulating the DC voltage of the DC link stage through the active converter stage;
   regulating the speed of the motor through the inverter stage;
   transferring the regulation of the DC voltage of the DC link stage to the inverter stage in response to the DC voltage of the DC link stage being less than a predetermined first threshold voltage;
   mechanically unloading the compressor;

regulating the DC voltage of the DC link stage through the inverter stage to a first voltage setpoint level by reversing power flow from the motor to the DC link; and additionally regulating the DC voltage of the DC link stage with the active converter stage to a second voltage setpoint level while the active converter stage is operating in a current limiting mode.

14. The method of claim 13, also comprising the step of shutting down the chiller system in response to the DC voltage of the DC link stage being less than a predetermined second DC threshold voltage.

15. The method of claim 14, wherein the monitored input parameter comprises an AC input voltage and the method further comprises the step of returning a system control mode to a normal operation mode in response to the AC input voltage exceeding a predetermined input voltage threshold.

16. The method of claim 15 wherein the step of returning the system control mode to normal operation mode comprises:

switching operation of the inverter stage from regulating the DC voltage of the DC link stage to regulating the motor speed through the inverter stage; and mechanically loading the compressor.

17. The method of claim 13 wherein the monitored input parameter comprises an input current to the active converter and the method includes the step of returning the system control mode to a normal operation mode in response to the input current falling below a predetermined input current threshold.

18. A method for controlling a variable speed drive to ride-through a voltage sag, comprising the steps of:

providing a motor and compressor mechanically coupled together;

providing a variable speed drive to power the motor, the variable speed drive including a passive rectifier stage and an inverter stage electrically coupled by a DC link stage;

monitoring a DC voltage of the DC link stage;

monitoring an input parameter of the passive rectifier stage;

stopping control of the motor with the inverter stage in response to the DC voltage being less than a predetermined first threshold voltage;

mechanically unloading the compressor; and controlling the DC voltage of the DC link stage with the inverter stage by reversing power flow from the motor to the DC link.

19. The method of claim 18, further comprising the steps of:

monitoring an AC input voltage of an AC input power source; and returning regulation of the DC voltage of the DC link stage to the passive converter stage in response to the monitored AC voltage being equal to or greater than a predetermined threshold voltage value.

20. The method of claim 18, wherein the passive rectifier is configured with a plurality of diodes.

21. The method of claim 18, wherein the passive rectifier is configured with a plurality of thyristors.

22. The method of claim 18, wherein the inverter stage comprises a plurality of inverters and the motor and the compressor comprise a plurality of motors and a plurality of compressors, each motor of the plurality of motors being mechanically coupled to one compressor of the plurality of compressors, each coupled motor and compressor having a corresponding inverter of the plurality of inverters.

23. The method of claim 22 wherein for each inverter of the plurality of inverter stages the step of regulating the DC voltage of the DC link stage through the inverter stage includes regulating the DC voltage of the DC link stage to a plurality of unique DC link voltage setpoints in response to a change in the monitored DC link voltage, each unique DC link voltage setpoint being associated with one of the plurality of inverters.

24. A chiller system comprising:

a compressor, a condenser, and an evaporator connected in a closed refrigerant loop;

a motor connected to the compressor to power the compressor; and a variable speed drive connected to the motor, the variable speed drive being configured to receive an input AC power at a fixed input AC voltage and a fixed input frequency and provide an output power at a variable voltage and variable frequency to the motor, the variable voltage having a maximum voltage greater in magnitude than the fixed input AC voltage and the variable frequency having a maximum frequency greater than the fixed input frequency, the variable speed drive comprising:

a converter stage connected to an AC power source providing the input AC power, the converter stage being configured to convert the input AC voltage to a DC voltage;

a DC link stage connected to the converter stage, the DC link stage being configured to filter the DC voltage and store energy from the converter stage;

an inverter stage connected to the DC link stage, the inverter stage being configured to convert the DC voltage from the DC link stage into the output power for the motor having the variable voltage and the variable frequency;

a control panel to control operation of the variable speed drive, the control panel being configured to regulate the DC voltage of the DC link stage with the inverter stage in response to the DC voltage being less than a predetermined first threshold voltage; and wherein the control panel regulates the DC voltage of the DC link stage with the inverter stage by providing control signals to mechanically unload the compressor, and reverse power flow from the motor to the DC link stage to control the DC voltage of the DC link stage.

25. The chiller system of claim 24, wherein the converter stage includes at least one precharge device, and the control panel is additionally configured to disable the at least one precharge device in response to the DC voltage of the DC link stage being less than a predetermined first threshold voltage.

26. The chiller system of claim 24, wherein the inverter stage comprises a plurality of inverters and the motor and the compressor comprise a plurality of motors and a plurality of compressors, each motor of the plurality of motors being mechanically coupled to one compressor of the plurality of compressors, each coupled motor and compressor having a corresponding inverter of the plurality of inverters.

27. The chiller system of claim 24, wherein the converter stage comprises a passive rectifier, and the control panel is configured to stop controlling the motor with the inverter stage in response to the DC voltage being less than a predetermined first threshold voltage.

28. The chiller system of claim 24, wherein the converter stage is configure to convert the input AC voltage to a boosted DC voltage, the boosted DC voltage being greater than the fixed input AC voltage, and the control panel is additionally configured to regulate the DC voltage of the DC link stage by increasing an input current through the converter stage in response to a decrease in AC line voltage up to a predetermined current limit value.

29. The chiller system of claim 28, wherein the control panel is additionally configured to control the DC voltage of the DC link stage with the converter stage while the converter stage is in a current limiting mode in response to the DC voltage of the DC link stage being greater than a predetermined first threshold voltage.

30. The chiller system of claim 29, wherein the control panel is additionally configured to disable the converter stage to isolate the DC link stage from the AC input power source in response to the DC voltage of the DC link stage being less than the predetermined first threshold voltage.

31. The chiller system of claim 30, wherein the control panel is additionally configured to regulate the DC voltage of the DC link stage to a first DC link voltage setpoint, and control the DC voltage of the DC link stage to a second DC link voltage setpoint in response to a change in the monitored DC link voltage being less than a predetermined first threshold voltage, the predetermined first threshold voltage being greater than the second DC link voltage setpoint.

32. The chiller system of claim 24, wherein the control panel is additionally configured to monitor an AC input voltage of an AC input power source, and transfer control of the DC voltage of the DC link stage to the converter stage in response to the monitored AC voltage being equal to or greater than a predetermined second threshold voltage.

33. The chiller system of claim 25, wherein the control panel is additionally configured, in response to the monitored AC voltage being equal to or greater than a predetermined second threshold voltage value, to enable the at least one precharge device and the converter stage, regulate the DC voltage of the DC link stage through the converter stage, regulate the motor speed through the inverter stage, and mechanically load the compressor.

* * * * *